US011190659B2

United States Patent
Colagrande et al.

(10) Patent No.: US 11,190,659 B2
(45) Date of Patent: Nov. 30, 2021

(54) IMAGE SCANNER WITH MULTIDIRECTIONAL ILLUMINATION

(71) Applicants: Silvia Colagrande, Rome (IT); Massimo Colagrande, Rome (IT); Lorenzo Colagrande, Rome (IT)

(72) Inventors: Silvia Colagrande, Rome (IT); Massimo Colagrande, Rome (IT); Lorenzo Colagrande, Rome (IT)

(*) Notice: Subject to any disclaimer, the term of this patent is extended or adjusted under 35 U.S.C. 154(b) by 0 days.

(21) Appl. No.: 16/761,418

(22) PCT Filed: Nov. 7, 2018

(86) PCT No.: PCT/IB2018/058725
§ 371 (c)(1),
(2) Date: May 4, 2020

(87) PCT Pub. No.: WO2019/092599
PCT Pub. Date: May 16, 2019

(65) Prior Publication Data
US 2021/0006681 A1  Jan. 7, 2021

(30) Foreign Application Priority Data
Nov. 9, 2017 (IT) .......................... 102017000127774

(51) Int. Cl.
*H04N 1/00* (2006.01)
*H04N 1/028* (2006.01)
(Continued)

(52) U.S. Cl.
CPC ..... *H04N 1/00827* (2013.01); *H04N 1/02805* (2013.01); *H04N 1/02865* (2013.01);
(Continued)

(58) Field of Classification Search
CPC ............. H04N 1/00827; H04N 13/207; H04N 13/254; H04N 1/02805; H04N 1/02865;
(Continued)

(56) References Cited

U.S. PATENT DOCUMENTS 5,173,796 A * 12/1992 Palm ....................... G01B 11/02
250/234
10,602,118 B2 * 3/2020 Zhang .................. H04N 13/161
(Continued)

FOREIGN PATENT DOCUMENTS

WO    2016063231 A1    4/2016

OTHER PUBLICATIONS

International Search Report and Written Opinion dated Jan. 7, 2019 for counterpart International Patent Applicaton No. PCT/IB2018/058725.
(Continued)

*Primary Examiner* — Negussie Worku
(74) *Attorney, Agent, or Firm* — Shuttleworth & Ingersoll, PLC; Timothy Klima

(57) ABSTRACT

An image scanner including a two-dimensional matrix sensor, a scanning plane defined by the axes, an optical system, an optical axis perpendicular to the scanning plane and coinciding with an axis, a lighting system including at least four light sources that have its own main axis and are positioned so that each light source is adjacent to one side of the scanning plane and illuminates it from a different direction. Each light source is arranged with its own main axis in a plane parallel to a facing mirror-reflecting surface above said facing mirror-reflecting surface and is oriented so as to radiate the scanning plane by specularly reflecting its light beams on the respective mirror-reflecting surface situated on the opposite side of the scanning plane with respect to the light source.

1 Claim, 3 Drawing Sheets

(51) Int. Cl.
  *H04N 13/207*   (2018.01)
  *H04N 13/254*   (2018.01)
(52) U.S. Cl.
  CPC ....... *H04N 1/02885* (2013.01); *H04N 13/207* (2018.05); *H04N 13/254* (2018.05)
(58) Field of Classification Search
  CPC ........... H04N 1/02885; H04N 1/00013; H04N 1/00018; H04N 1/00092; H04N 1/00519–00679; H04N 1/00681–00791; H04N 1/00785–00827; H04N 1/00835; H04N 1/00909; H04N 1/024–0318; H04N 1/04–207; H04N 2201/024–04798; G03B 15/06
  USPC ......................................... 358/474, 475, 509
  See application file for complete search history.

(56) References Cited

U.S. PATENT DOCUMENTS

| | | | | |
|---|---|---|---|---|
| 11,070,789 | B1* | 7/2021 | Gao | H04N 13/254 |
| 2003/0193800 | A1* | 10/2003 | Lai | G03B 15/03 |
| | | | | 362/240 |
| 2003/0206248 | A1* | 11/2003 | Childers | H04N 5/7416 |
| | | | | 348/745 |
| 2004/0057088 | A1* | 3/2004 | Fukuzawa | H04N 1/1013 |
| | | | | 358/509 |
| 2007/0176927 | A1* | 8/2007 | Kato | G06T 7/586 |
| | | | | 345/426 |
| 2010/0213392 | A1* | 8/2010 | Hatzav | G03B 15/00 |
| | | | | 250/492.1 |
| 2011/0304705 | A1* | 12/2011 | Kantor | A61B 5/0059 |
| | | | | 348/49 |
| 2013/0120808 | A1* | 5/2013 | Ichikawa | H04N 1/02865 |
| | | | | 358/475 |
| 2013/0246727 | A1* | 9/2013 | Hikono | G06F 13/1605 |
| | | | | 711/163 |
| 2015/0355101 | A1 | 12/2015 | Sun | |
| 2015/0370146 | A1* | 12/2015 | Johnson | G03B 15/07 |
| | | | | 396/4 |
| 2017/0230528 | A1* | 8/2017 | Colagrande | H04N 1/04 |

OTHER PUBLICATIONS

European Office Action dated Mar. 18, 2021 from counterpart EP App No. 18 808 503.9.
Response to European Office Action dated Jul. 12, 2021 from counterpart EP App No. 18 808 503.9.

* cited by examiner

IMAGE SCANNER WITH MULTIDIRECTIONAL ILLUMINATION

This application is the National Phase of International Application PCT/IB2018/058725 filed Nov. 7, 2018 which designated the U.S.

This application claims priority to Italian Patent Application No. 102017000127774 filed Nov. 9, 2017, which application is incorporated by reference herein.

TECHNICAL FIELD

The present invention relates to an image scanner with multidirectional illumination, based on a two-dimensional matrix sensor for color or grayscale images. Such a two-dimensional matrix sensor is suitable for obtaining color and 3D elevation information, through the digitization of objects and three-dimensional surfaces according to the "Photometric Stereo" technique and therefore is able to generate elevation, height and relief 3D information of the digitization object by combining the information of different images of the object, all said images being acquired from the same point of view but varying the direction of lighting in the different acquisitions. The object of digitization is a surface portion of a three-dimensional object such as a coin or a vase or a basically flat surface with three-dimensional details such as a surface of painting, bas-relief, fabric, leather, wood panel, slab of marble, stone, ceramics, wallpaper, printing matrix, etc.

BACKGROUND ART

Industrial reproduction for decorative purposes of such surfaces requires the digitization of color information but also often the digitization of elevation, height and relief information in such a way as to be able to copy and reproduce, in the smallest details, the three-dimensional structure of the original surface. Art reproduction also has digitization requirements similar to industrial reproduction for decorative purposes. Printing for decorative purposes, for example for making gadgets, cellphone covers, restaurant menus, etc. has now also acquired the ability to reproduce relief surfaces that mimic natural surfaces and therefore also needs to digitize elevation information in addition to color information. CAD and virtual reality applications also need to create material libraries that include color and 3D information in order to naturally simulate different types of materials on virtual objects and surfaces.

The applications described above need to capture highly detailed elevation information and therefore at very high resolution and very often also on large formats.

With such high requirements the digitization of elevation, height and relief information was until recently mainly realized using the "punctual scanning" technique (for example by using a laser or confocal sensor) and more recently also using the technique "Photometric Stereo" thanks to the introduction of a category of scanners created on the basis of the teachings of WO/2016/063231. The "Photometric Stereo" technique has clear advantages compared to punctual scanning as, among other things, it allows faster digitization times and provides color information in addition to elevation information.

The "Photometric Stereo" technique allows to estimate a "Normal Map" of the surface of an object starting from a set of color or grayscale digital images of the same, in particular by repeating the digitization of the object with illuminations from different directions. The "Photometric Stereo" technique allows also to obtain a kind of elevation model commonly defined "Depth Map", for example through a process of integration of the "Normal Map", but also directly according to the algorithms used to realize the "Photometric Stereo". Both the "Normal Map" and the "Depth Map" allow you to generate 3D representations of the digitized object.

The imaging systems that implement the "Photometric Stereo" technique are basically divided into two categories today.

The first category consists of integrated systems and more in detail of professional scanners, generally of medium or large format, the professional scanners being based on linear sensors, precision mechanical movements and a compact lighting system that is integrated in the scanning process; these integrated systems provide high quality and repeatability results and are characterized by a high simplicity of use thanks to the integration of all the parts, but they are generally very expensive.

The second category consists of non-integrated systems, generally of medium-small format, being based on a matrix camera and a traditional lighting system arranged and managed in a manual way; these are systems which, thanks to the fact that they do not require precision mechanical movements, have a lower cost, but do not always provide optimal quality results, and cannot be easily operated by anyone due to the lack of integration between the parts. The main obstacle to the realization of an integrated Photometric Stereo scanner based on a matrix sensor is related to the positioning and arrangement of the light sources; in fact, an optimal implementation of the "Photometric Stereo" technique requires that at least four light sources be placed so as to uniformly illuminate the viewing area from at least four different directions; but with respect to a linear sensor, the viewing area of a matrix sensor is much wider and therefore requires to position the light sources at a greater distance from the viewing plane in order to guarantee the necessary uniformity of illumination, in particular maintaining the parallelism and the direction of the light rays and this obviously makes the creation of a compact lighting system much more difficult and in particular makes integration into a scanner very difficult. To be noted that the use of light diffusing surfaces, aimed to increase the light uniformity in the scanner area, but without retaining the required light directionality and parallelism of the light rays, must be avoided in the scanner embodiment in order be able to use the "Photometric Stereo" technique. The "Photometric Stereo" technique requires in fact that all incident light rays over the scan area are coming from the same direction at one specific time and that different enlightening directions must be possible in order to capture the same scan area with different enlightening directions at different times. More in detail each light source need to be arranged and orientated in order to radiate directly the scan area from a specific direction and therefore no light diffuser elements should be placed in the light rays path so as to prevent the light rays to bounce back in the scan area from a different direction and therefore maintain the required light rays parallelism and directionality. Furthermore, the light sources should be arranged so as to ensure that light rays incidents in different points of the scan area have similar direction and intensity and this can usually only be ensured by placing the light sources at great distance from the scan area, unless a different solution can be found. Implementing a diffused illumination would otherwise be the simpler way to solve a generic light uniformity issue but would render impossible to use the "Photometric Stereo" technique which is the object of the current invention. A different solution, not based on light diffusion, aimed to maintain light directionality while at the same time providing uniform enlightening over the scan area, is therefore needed.

The creation of an integrated scanner, based on a matrix sensor, would be desirable, but would require the creation of a compact lighting system that provides at the same time the optimal lighting for the implementation of the "Photometric Stereo" technique.

More in detail, it would be desirable, an integrated solution allowing to irradiate the scan area as required by the "Photometric Stereo" technique but at the same time without having to place the light sources at great distance from the scan area so as to reduce the embodiment size of the scanner.

FIG. 1 shows, in an axonometric view, a detail of a prior art embodiment of an image scanner based on a matrix type sensor 1 in which the digitization takes place by acquisition of the digitization object placed on the scanning plane 4. In particular, the acquisition is performed by the unit consisting of the image sensor 1 and the optical system 2 which are oriented on an optical axis 3 perpendicular to the scanning plane 4 and centered thereon. The axes x, y and z define a system of Cartesian axes in which the x and y axes are at right angles to each other, coplanar to the scanning plane 4 and centered on the optical axis 3, and the z axis, perpendicular to the axes x, y, corresponds exactly to the optical axis 3. The detail of this embodiment comprises a single light source 5a centered on the axis x and arranged so as to irradiate the entire scanning plane 4 from a direction. In this prior art embodiment, distance traveled from the rays of light emitted by the light source 5a as well as incidence angulation thereof on the scanning plane 4 at different points 6a, 7a are very different as a consequence of the light source 5a being relatively close to the scanning plane 4. This results in a relatively high unevenness of illumination on the scanning plane 4 shown in FIG. 1 by a uneven dotting thereof.

FIG. 2 shows, in an axonometric view, a detail of a typical prior art embodiment identical to FIG. 1 with the exception of the light source 5a which is placed at a greater distance from the scanning plane 4. As a result, in the embodiment of FIG. 1 the distance traveled from the rays of light emitted by the light source 5a as well as the incidence angulation thereof on the scanning plane 4 at different points 6a, 7a are more similar and therefore determine a greater uniformity of illumination on the scanning plane 4 that is shown in FIG. 2 by a uniform dotting thereof.

FIG. 3 shows, in an axonometric view, a typical prior art embodiment of a image system based on a matrix sensor 1 and adapted to the implementation of the "Photometric Stereo" technique. In this prior art embodiment there are in fact four light sources 5a, 5b, 5c, 5d arranged so as to uniformly illuminate the scanning plane 4 from corresponding four different directions. This prior art embodiment, however, makes it very difficult to integrate the parts into a scanner due to the space required by the lighting system.

It would therefore be desirable to create a scanner based on a two-dimensional matrix sensor that is able to solve the previously described problem and, in particular, that provides a small lighting system suitable for optimally implementing the "Photometric Stereo" technique and therefore a compact lighting system that illuminates however the scan plane evenly and from at least four different directions.

US 2003/0193800 A1 describes a light box with diffused and uniform lighting for the photographic reproduction of objects. Four light sources in the form of tubes are arranged at the four vertical edges inside the light box. Each light source is covered by a curved plate designed to diffuse the light in all directions. The walls of the light box are covered with a gray layer or paint to evenly diffuse the light. The diffused lighting system does not provide an optimal solution for the implementation of the "Photometric Stereo" technique, since, even if only one light source is activated at a time, the object of digitization would still be radiated in a relatively diffused manner, from multiple directions simultaneously and not from one direction as required.

US 2010/0213392 A1 describes a light mixing chamber for illuminating an object with substantially uniform illumination. As for the previous patent US 2003/0193800 A1 the diffused lighting system does not provide a solution for the implementation of the "Photometric Stereo" technique, since, when only one light source is activated at a time, the object of digitization would be radiated unevenly and moreover in a relatively diffused manner because of light ray bouncing back into the scan area and object of digitization also from different directions within the mixing chamber, therefore from multiple directions simultaneously and not from one specific direction as required by the Photometric Stereo technique.

US 2015/0370146 describes a collapsible and therefore portable light box, which allows to illuminate objects to be photographed with direct and diffused light. Light sources are represented at the top of the box on opposite walls, but could be of different numbers and placed in different places inside the box. The opposing side walls can have different colors to achieve particular lighting effects. The lighting system of US 2015/0370146 does not provide an optimal solution for the implementation of the "Photometric Stereo" technique. Indeed, even if only one light source is activated at a time and the diffusion of light inside the box is minimized, by using for example black colored plates for the back walls, a lighting solution similar to the one described in FIG. 1 of the accompanying drawing would be obtained. In both cases, the object to be photographed is irradiated by a specific direction but in an uneven manner. This occurs because of the arrangement of the sources of light and, in particular, of the close distance between the light sources and the object to be photographed.

SUMMARY OF THE INVENTION

In this context, the technical task underlying the present invention is to propose an image scanner for digitizing three-dimensional surfaces according to the "Photometric Stereo" technique which overcomes the drawbacks of the prior art mentioned above.

An object of the present invention is to provide an image scanner, based on a two-dimensional matrix sensor, provided with a simple and compact lighting system which overcomes the limits of unevenness of the lighting described above.

Another object of the invention is to provide a lighting system arranged in a manner optimal for the "Photometric Stereo" technique.

The invention provides an image scanner including a two-dimensional matrix sensor, a scanning plane defined by the axes x, y at right angles each other, an optical system, an optical axis perpendicular to the scanning plane and coinciding with an axis z perpendicular to the scanning plane, a lighting system comprising at least four light sources that have its own main axis and are positioned so that each light source is adjacent to one side of the scanning plane and illuminates it from a different direction, wherein each light source is arranged with its own main axis in a plane parallel to a facing mirror-reflecting surface above said facing mirror-reflecting surface and is oriented so as to radiate the scanning plane by specularly reflecting its light beams on the respective mirror-reflecting surface situated on the opposite side of the scanning plane with respect to the light source and adjacent to the scanning plane.

According to the invention, the scanner uses a two-dimensional matrix sensor whose viewing area is much wider than that of a linear sensor: this would require placing the light sources at a greater distance from the viewing plane in order to guarantee the necessary uniformity of lighting. Differently from the prior art cited above, each light source is adjacent to one side of the scanning plane and oriented so as to indirectly illuminate the viewing plane through the specular reflection of the light rays on a mirror-reflecting surface placed on the wall of in front of the light source. In other words, the rays of light emitted by the light source and arriving at the scanning plane are more parallel because they have to travel a greater distance before reaching the scanning plane and this causes a greater uniformity of illumination while allowing the realization of a relatively compact system.

In greater detail, as is known, the mirror-reflecting surface, when it is hit by a beam of parallel light rays, reflects the beam while maintaining the parallelism of the light rays, that is to say without spreading the light emitted in different directions as does the light box of the known technique.

BRIEF DESCRIPTION OF DRAWINGS

Further characteristics and advantages of the present invention will become most clear from the indicative, and therefore not limiting, description of an embodiment of an image scanner with multidirectional illumination as illustrated in the accompanying drawings in which.

DESCRIPTION OF AN INVENTION EMBODIMENT

Figure 4:
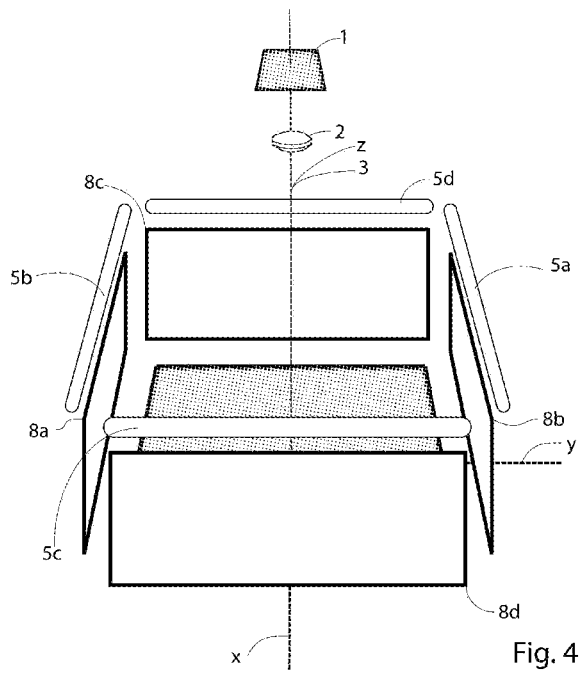
FIG. 4 is an axonometric view of a first embodiment of the scanner according to the present invention.
Figure 5:
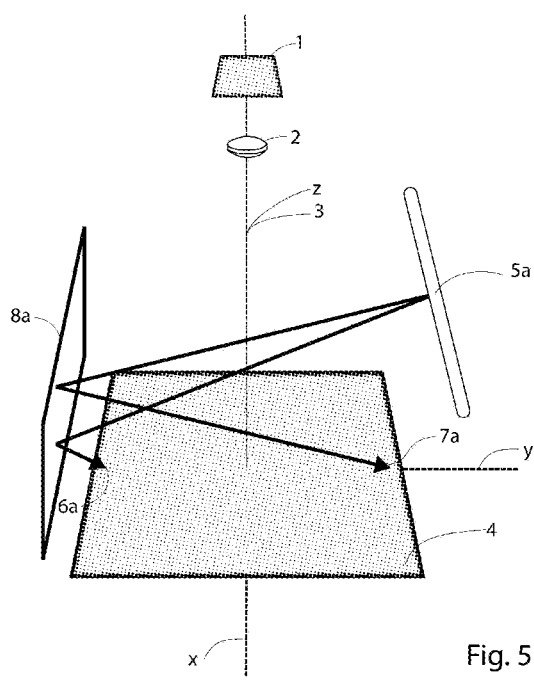
FIG. 5 represents a detail of the light source 5a of FIG. 4.

With reference to FIGS. 4 and 5, an image scanner based on a two-dimensional matrix type sensor 1 according to the present invention acquires the object of the digitization placed on the scanning plane 4. As in the state of the art, the acquisition is carried out by a unit consisting of the image sensor 1 and the optical system 2 which are oriented on an optical axis 3 perpendicular to the scanning plane 4 and centered thereon. The axes x, y and z define a system of Cartesian axes in which the x and y axes are at right angles to each other, coplanar to the scanning plane 4 and centered on the optical axis 3, and the z axis, perpendicular to the axes x, y corresponds exactly to the optical axis 3.

According to an embodiment of the invention, a lighting system comprises four light sources 5a, 5b, 5c, 5d having its own axis and being arranged so that each light source is adjacent to one side of the scanning plane 4 and illuminating it from a different direction. In the embodiment presented, each light source 5a, 5b, 5c, 5d is arranged with its own main axis in a plane parallel to a facing mirror-reflecting surface 8a, 8b, 8c, 8d, above a respective mirror-reflecting surface 8a, 8b, 8c, 8d, so as to irradiate with light rays such mirror-reflecting surface 8a, 8b, 8c, 8d situated in the opposite side of the scanning plane 4 with respect to the light source 5a, 5b, 5c, 5d, and adjacent said scanning plane 4, being oriented so as to reflect its rays of light on the scanning plane 4.

In the detail of FIG. 5, for simplicity, a single light source 5a is shown, centered on the axis x and arranged above the mirror-reflecting surface 8a so as to irradiate the mirror-reflecting surface 8a, from which the rays are directed at the entire scanning plane 4. Schematically, it is shown that any emission of light from the source 5a, specularly reflected from the mirror reflecting surface 8a, hits the whole surface of the scanning plane 4 along the line defined by the arrows 6a, 7a.

Figure 1:
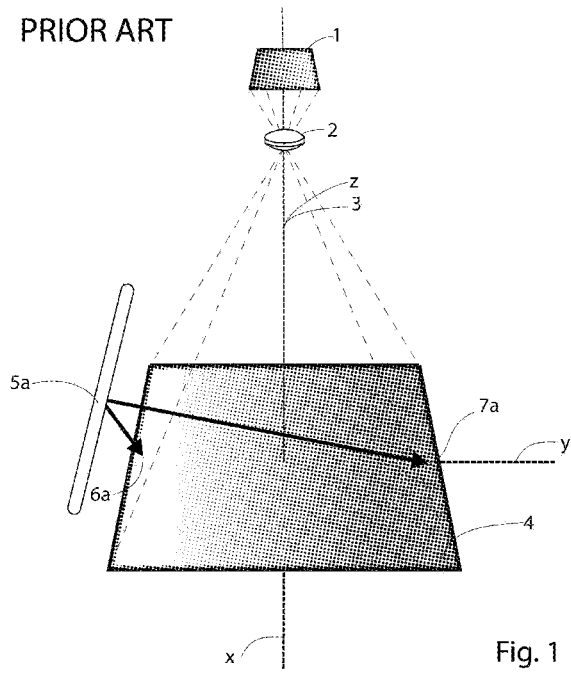
FIGS. 1 to 3 are axonometric views of a detail of a known embodiment of an image scanner.
Figure 2:
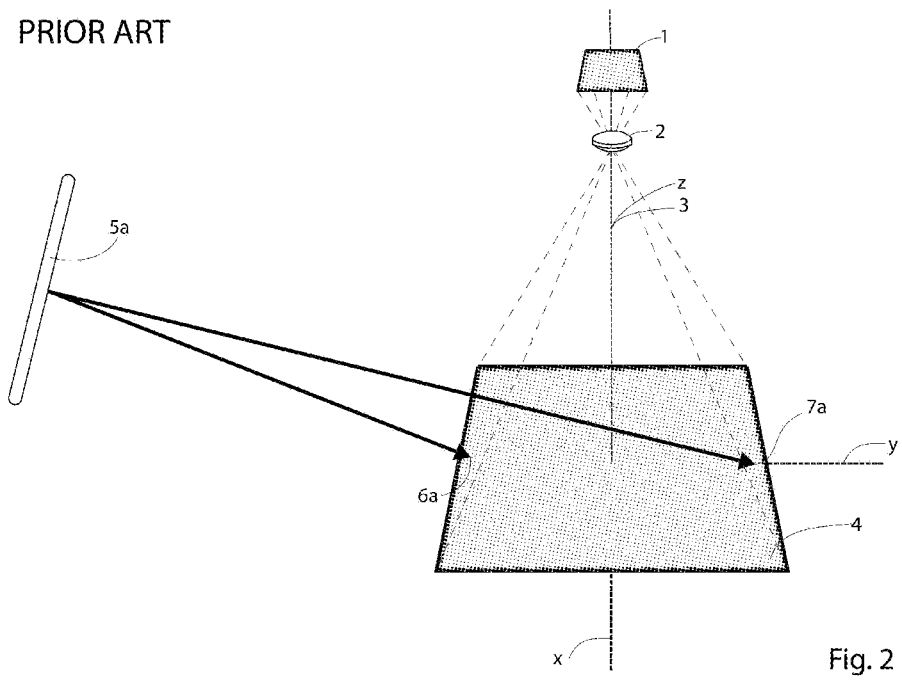

The advantages of the invention with respect to the prior art are understood. Compared to a scanner of the same size shown in FIG. 1, a high uniformity of illumination is achieved on the scanning plane 4.

Figure 3:
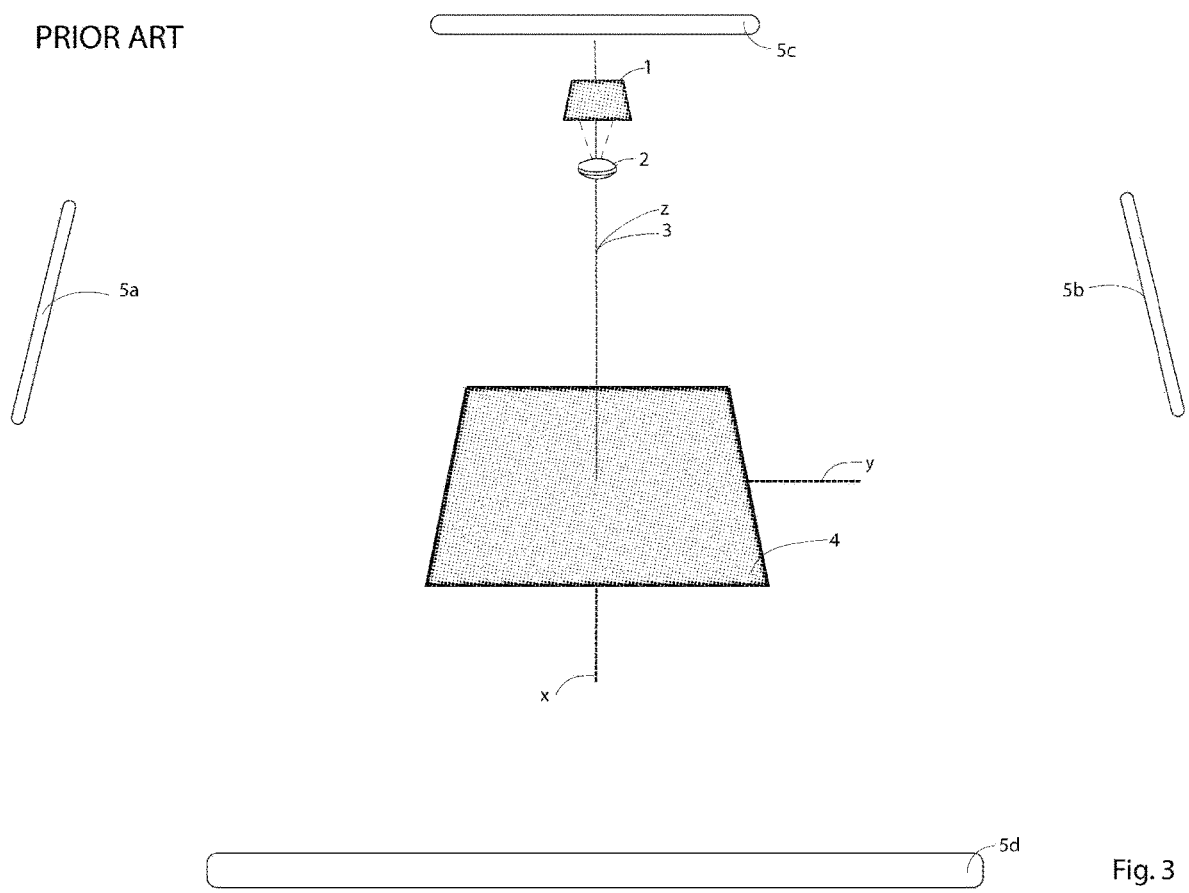

With the same lighting as that obtained in the scanner of FIG. 3, a compact scanner of reduced dimensions is obtained.

It should also be understood that the light sources, as well as the mirror-reflecting surfaces, may be more than four in number, to obtain for example a greater number of different lighting directions and therefore further optimize the results obtainable from the application of the Photometric Stereo technique.

The invention claimed is:

1. An image scanner comprising:
   a two-dimensional matrix sensor,
   a scanning plane defined by x and y axes at right angles to each other,
   an optical system,
   an optical axis perpendicular to the scanning plane and coinciding with a z axis perpendicular to the scanning plane,
   a lighting system arranged according to requirements of a Photometric Stereo technique and comprising four light sources, with each of the four light sources being elongated along a respective main axis parallel to one of the x and y axes,
   the light sources being positioned so that each of the light sources is adjacent to one side of the scanning plane and illuminates the scanning plane from a different direction,
   four mirror-reflecting surfaces respectively facing the four light sources on opposite sides of the scanning plane,
   wherein each of the light sources:
      is arranged such that the respective main axis is positioned 1) in a plane parallel to the respective facing mirror-reflecting surface, and 2) above the respective facing mirror-reflecting surface, and
      is oriented so as to radiate the scanning plane by specularly reflecting light beams onto the scanning plane via the respective facing mirror-reflecting surface.

* * * * *